United States Patent
Uto et al.

(10) Patent No.: US 9,126,293 B2
(45) Date of Patent: Sep. 8, 2015

(54) ASSEMBLING METHOD OF VEHICULAR AIR-CONDITIONING APPARATUS

(75) Inventors: Taichi Uto, Tokyo (JP); Hiroshi Uehara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 193 days.

(21) Appl. No.: 13/810,709

(22) PCT Filed: Aug. 30, 2010

(86) PCT No.: PCT/JP2010/005315
§ 371 (c)(1),
(2), (4) Date: Jan. 17, 2013

(87) PCT Pub. No.: WO2012/029086
PCT Pub. Date: Mar. 8, 2012

(65) Prior Publication Data
US 2013/0112282 A1    May 9, 2013

(51) Int. Cl.
*B23P 11/00*   (2006.01)
*B61D 27/00*   (2006.01)
*B60H 1/00*    (2006.01)

(52) U.S. Cl.
CPC ............ *B23P 11/00* (2013.01); *B60H 1/00535* (2013.01); *B60H 1/00542* (2013.01); *B61D 27/00* (2013.01); *Y10T 29/49359* (2015.01); *Y10T 137/0402* (2015.04)

(58) Field of Classification Search
CPC .. B60H 1/00535; B60H 1/32; B60H 1/00542; B23P 11/00; B61D 27/00; Y10T 29/49359; Y10T 137/0402

USPC ...................... 29/890.035; 62/244; 137/15.01
See application file for complete search history.

(56) References Cited

U.S. PATENT DOCUMENTS 4,675,971 A * 6/1987 Masserang ...................... 29/422
5,129,144 A * 7/1992 Halstead et al. ......... 29/890.035
(Continued)

FOREIGN PATENT DOCUMENTS

| CN | 101421125 A | 4/2009 |
|----|-------------|--------|
| JP | 58-67234    | 5/1983 |

(Continued)

OTHER PUBLICATIONS

Partial Human Translation of JP 58-162818 (Utility Model 58-067234, submitted by Applicant as part of IDS filed Jan. 17, 2013).*

(Continued)

*Primary Examiner* — Sarang Afzali
(74) *Attorney, Agent, or Firm* — Buchanan Ingersoll & Rooney PC

(57) ABSTRACT

An assembling method of a vehicular air-conditioning apparatus including various equipment, which is required for air-conditioning a vehicle, mounted in a vehicular-air-conditioner frame on a production line includes modularization of, among the various equipment, at least a compressor, an indoor heat exchanger, and an outdoor heat exchanger off the production line, and, further, modularization of a refrigeration cycle by connecting the above modules with refrigerant pipes off the production line, as well as incorporating the modularized refrigerant cycle into assembly work on the production line as a refrigerant cycle module.

7 Claims, 5 Drawing Sheets

(56) References Cited

U.S. PATENT DOCUMENTS

| | | | |
|---|---|---|---|
| 5,603,152 A * | 2/1997 | Le et al. | 29/506 |
| 6,629,424 B1 * | 10/2003 | Araki et al. | 62/244 |

FOREIGN PATENT DOCUMENTS

| | | |
|---|---|---|
| JP | 58-206417 A | 12/1983 |
| JP | 59-149513 U | 10/1984 |
| JP | 61-232917 A | 10/1986 |
| JP | 1-172907 U | 12/1989 |
| JP | 8-216671 A | 8/1996 |
| JP | 08318795 A | 12/1996 |
| JP | 2000-142394 A | 5/2000 |
| JP | 2004196282 A | 7/2004 |
| JP | 2008-126800 A | 6/2008 |
| JP | 2008-155827 A | 7/2008 |
| WO | 2008/078159 A1 | 7/2008 |

OTHER PUBLICATIONS

Machine Translation of JP 08-216671A (submitted by Applicant as part of IDS filed Jan. 17, 2013).*

Machine Translation of JP 2008-126800A (submitted by Applicant as part of IDS filed Jan. 17, 2013).*

Machine Translation of JP 2008-155827A (submitted by Applicant as part of IDS filed Jan. 17, 2013).*

International Search Report (PCT/ISA/210) issued on Sep. 21, 2010, by the Japanese Patent Office as the International Searching Authority for International Application No. PCT/JP2010/005315.

Office Action (Notice of Reasons for Refusal) issued on Dec. 3, 2013, by the Japanese Patent Office in corresponding Japanese Patent Application No. 2012-531554, and an English Translation of the Office Action. (5 pages).

Japanese Office Action dated Jul. 29, 2014 issued in corresponding Japanese Patent Appln. No. 2012-531554, with English translation (5 pages).

Chinese First Office Action dated Sep. 26, 2014 issued in the corresponding Chinese Patent Application No. 201080068875.5 and English language translation (14 pages).

Chinese Second Office Action dated Jun. 10, 2015 issued in the corresponding Chinese Patent Application No. 201080068875.5 and English language translation (6 pages).

* cited by examiner ical Field

The present invention relates to an assembling method of a vehicular air-conditioning apparatus mounted on, for example, a roof of a railroad vehicle.

BACKGROUND ART

As conventional vehicular air-conditioning apparatuses, there exists, for example, one that disposes a compressor in the middle portion of a casing of an air-conditioning apparatus in the length direction of the vehicle, disposes an indoor fan on both sides of the compressor, and further disposes an indoor heat exchanger on both sides of each indoor fan, as well as disposing an outdoor fan on both ends of the casing in the length direction of the vehicle. (For example, see Patent Literature 1.)

CITATION LIST

Patent Literature

Patent Literature 1: Japanese Unexamined Patent Application Publication No. 61-232917 (page 2, FIG. 1)

SUMMARY OF INVENTION

Technical Problem

Incidentally, as regards vehicular air-conditioning apparatuses, a compressor, an indoor heat exchanger, an outdoor heat exchanger, which are main equipment of a refrigeration cycle, a check valve, a solenoid valve, and the like, which are auxiliary equipment, are arranged and fixed to a vehicular-air-conditioner frame and are each brazed to a refrigerant pipe on a production line. With this assembling method, since brazing is carried out in an unnatural body position depending on the brazing point, there has been risk of adverse effect on quality. Further, since the above-described work is all carried out on a production line, there exists a need to improve productivity.

The invention is directed to solve the above-described problems and an object thereof is to reduce brazing work on the production line and to provide an assembling method of a vehicular air-conditioning apparatus capable of improving quality and increasing productivity.

Solution to Problem

An assembling method of a vehicular air-conditioning apparatus according to the invention including various equipment, which is required for air-conditioning a vehicle, mounted in a vehicular-air-conditioner frame on a production line includes the steps of modularizing a refrigerant cycle including at least a compressor, an indoor heat exchanger, and an outdoor heat exchanger, among the various equipment, that are connected with refrigerant pipes by assembling the refrigerant cycle off the production line; and incorporating the refrigerant cycle into assembly work on the production line as a refrigerant cycle module.

Advantageous Effects of Invention

According to the invention, a refrigeration cycle including at least a compressor, an indoor heat exchanger, and an outdoor heat exchanger that are connected with refrigerant pipes is modularized by assembling them off a production line. The refrigeration cycle is incorporated into an assembly work on the production line as a refrigerant cycle module. Accordingly, there is no need for brazing work of the refrigerant pipes on the production line; hence, work is facilitated, quality improvement is enabled, and productivity can be substantially improved.

DESCRIPTION OF EMBODIMENT

Figure 1:
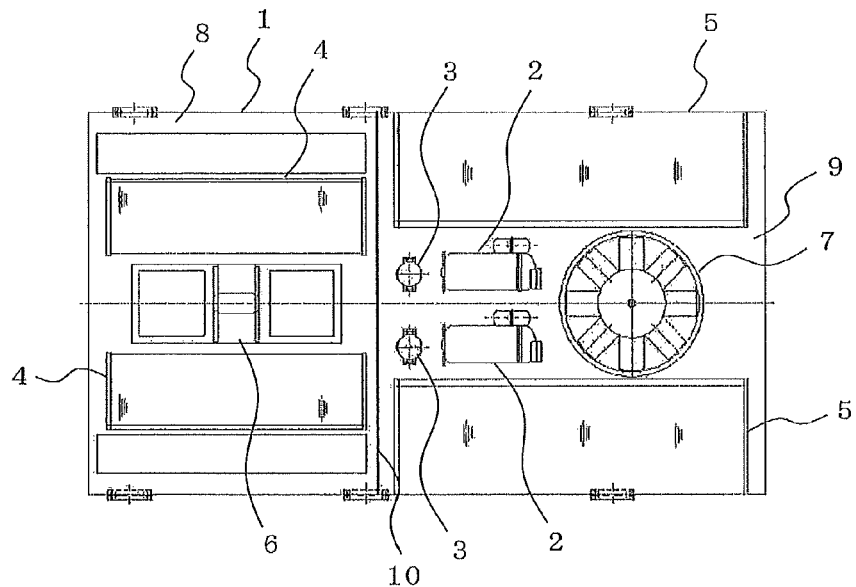
FIG. 1 is a plan view illustrating a vehicular air-conditioning apparatus according to an exemplary embodiment seen from above.
Figure 2:
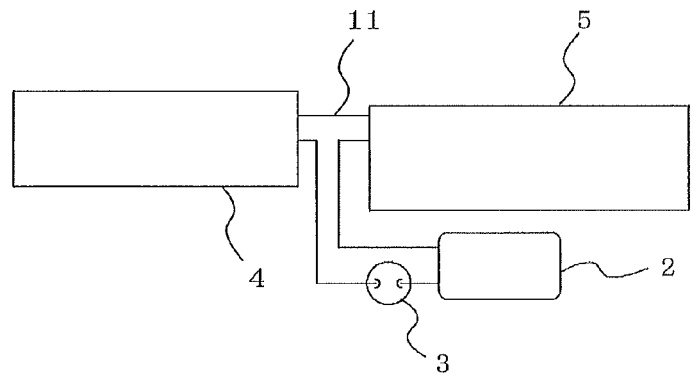
FIG. 2 is a block diagram illustrating an outline of a refrigeration cycle of the vehicular air-conditioning apparatus according to the exemplary embodiment.

FIG. 1 is a plan view illustrating a vehicular air-conditioning apparatus according to an exemplary embodiment seen from above, and FIG. 2 is a block diagram illustrating an outline of a refrigeration cycle of the vehicular air-conditioning apparatus according to the exemplary embodiment.

The vehicular air-conditioning apparatus according to the exemplary embodiment is mounted on, for example, a roof of a railroad vehicle (hereinafter, referred to as a "vehicle"). As shown in FIG. 1, the vehicular air-conditioning apparatus includes a rectangular vehicular-air-conditioner frame 1, a partition plate 10 forming an indoor compartment 8 and an outdoor compartment 9 by partitioning the vehicular-air-conditioner frame 1 in the length direction of the vehicle, an indoor fan 6 mounted on the center line of the indoor compartment 8 in the length direction of the vehicle, indoor heat exchangers 4 secured on both sides of the indoor fan 6, an outdoor fan 7 mounted on the center line of the outdoor compartment 9 in the length direction of the vehicle, compressors 2 and refrigerant gas-liquid separators 3 that are provided on both sides relative to the center line, and outdoor heat exchangers 5 secured on both sides of the outdoor fan 7.

As shown in FIG. 2, a refrigeration cycle of the vehicular air-conditioning apparatus is configured by interconnecting the compressor 2 and the refrigerant gas-liquid separator 3, the refrigerant gas-liquid separator 3 and the indoor heat exchanger 4, and the indoor heat exchanger 4 and the outdoor heat exchanger 5, with refrigerant pipes 11.

An assembling method of the above-described vehicular air-conditioning apparatus will now be described.

Figure 3:
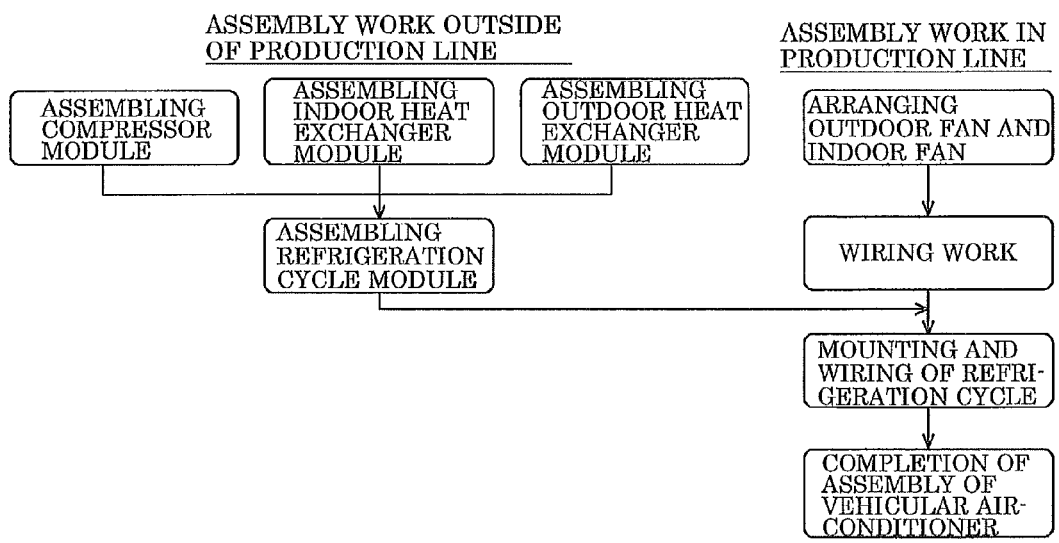
FIG. 3 is a flowchart illustrating an assembling method of the vehicular air-conditioning apparatus according to the exemplary embodiment.

FIG. 3 is a flowchart illustrating an assembling method of the vehicular air-conditioning apparatus according to the exemplary embodiment.

Regarding the assembling of the vehicular air-conditioning apparatus, a refrigeration cycle including a compressor module, an outdoor heat exchanger module, and an indoor heat exchanger module assembled and each connected with refrigerant pipes 11 off the production line is modularized (hereinafter, referred to as a "refrigeration cycle module"). Then, the assembling of the vehicular air-conditioning apparatus is completed by arranging the refrigeration cycle module, on the production line, into the vehicular-air-conditioner frame 1 mounted with the indoor fan 6 and the outdoor fan 7, and by installing and performing wiring work to the refrigeration cycle module.

With such assembling of the refrigeration cycle module off the production line, scarcely any brazing work of the refrigerant pipes 11 is required on the production line. Accordingly, work is facilitated, and it is possible to improve quality. Further, it is possible to carry out assembling of the refrigeration cycle module and the assembling of other devices concurrently. Furthermore, since it is possible to carry out vacuum drawing of and charging of the refrigerant to the components of the refrigeration cycle, productivity can be improved substantially.

The assembling of the compressor module will be described subsequently.

Figure 4:
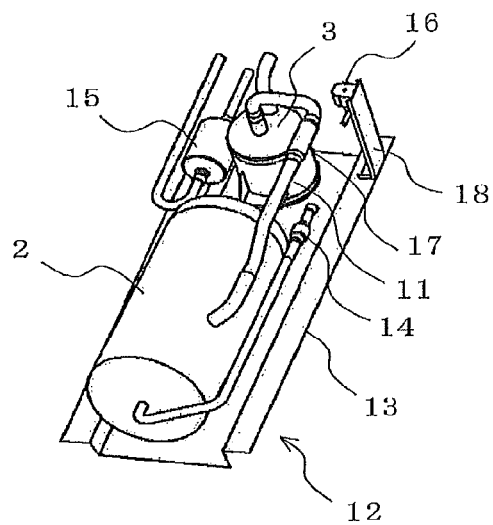
FIG. 4 is a perspective view illustrating a compressor module of the vehicular air-conditioning apparatus according to the exemplary embodiment.
Figure 5:
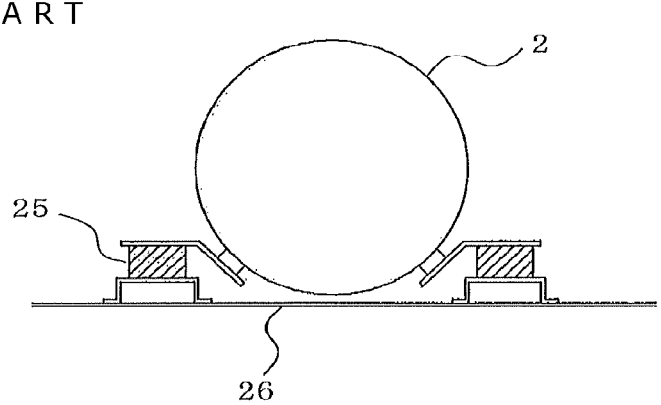
FIG. 5 is a front view illustrating a mounting example of a conventional compressor.
Figure 6:
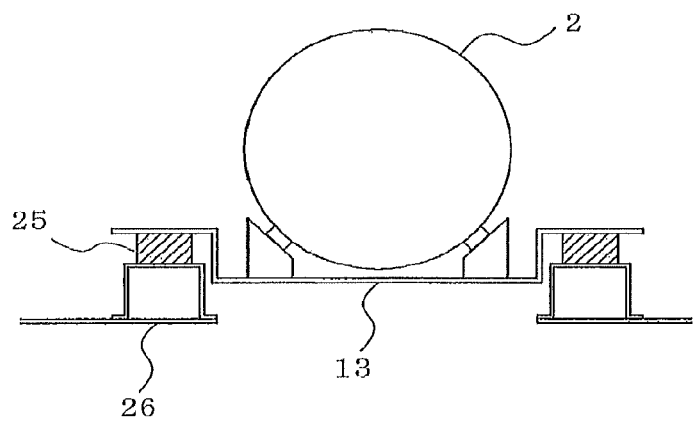
FIG. 6 is a front view illustrating a mounting example of the compressor illustrated in FIG. 4.

FIG. 4 is a perspective view illustrating the compressor module of the vehicular air-conditioning apparatus according to the exemplary embodiment, FIG. 5 is a front view illustrating a mounting example of a conventional compressor, and FIG. 6 is a front view illustrating a mounting example of the compressor illustrated in FIG. 4.

As shown in FIG. 4, the above-mentioned compressor module 12 includes a sectionally groove-shaped support 13 having a flange on both ends; the compressor 2 disposed on the base plate of the support 13; the refrigerant gas-liquid separator 3, a check valve 14, a drying device 15, a solenoid valve 16, and a filter 17 that are pieces of auxiliary equipment; and the refrigerant pipes 11 connected to the compressor 2 and the auxiliary equipment by brazing. The solenoid valve 16 and other auxiliary equipment that need support are secured to a mounting member 18 provided to the support 13. The above-mentioned check valve 14 is a piece of auxiliary equipment for preventing backflow of the refrigerant, and the drying device 15 is a piece of auxiliary equipment for removing moisture content in the refrigerant. Further, the solenoid valve 16 is a piece of auxiliary equipment for controlling the flow rate of the refrigerant, and the filter 17 is a piece of auxiliary equipment for filtering the refrigerant.

Conventionally, as shown in FIG. 5, the compressor 2 is secured to the vehicular-air-conditioner frame 1 interposed with rubber vibration insulators 25 therebetween. With this structure, a sound amplification phenomenon has been encountered since the frame 1 functions as a speaker with the propagation of the sound generated by the compressor 2 to the base plate 26. Accordingly, as shown in FIG. 6, in the exemplary embodiment, since it will be possible to remove the base plate under the support 13 by interposing the support 13 of the compressor module 12 and the rubber vibration insulators 25 between the compressor 2 and the vehicular-air-conditioner frame 1, vibration propagation to the base plate 26 can be suppressed and sound can be released to the space so as not to be amplified; hence, noise reduction can be achieved.

Assembling of the indoor heat exchanger module and the outdoor heat exchanger module will be described next.

Figure 7:
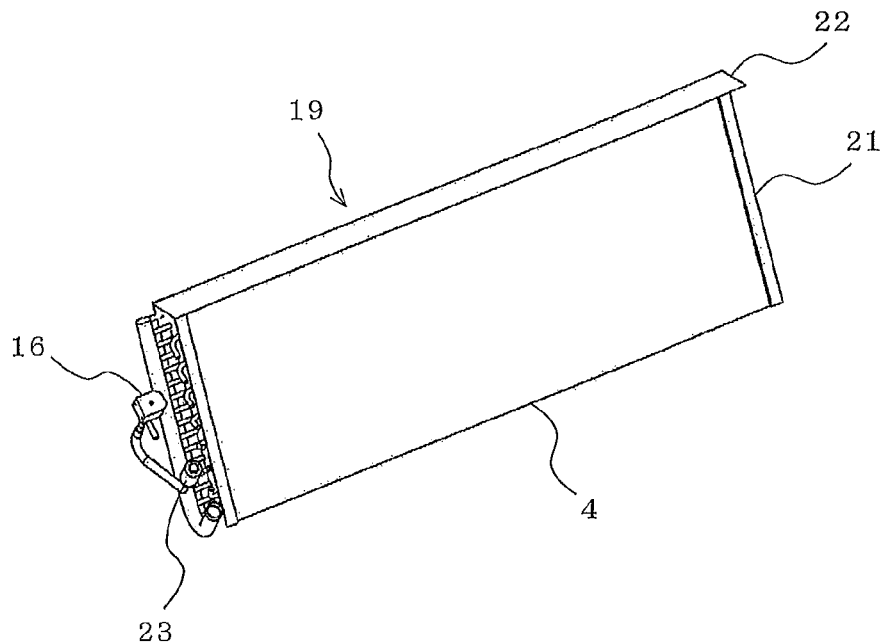
FIG. 7 is a perspective view illustrating an indoor heat exchanger module of the vehicular air-conditioning apparatus according to the exemplary embodiment.
Figure 8:
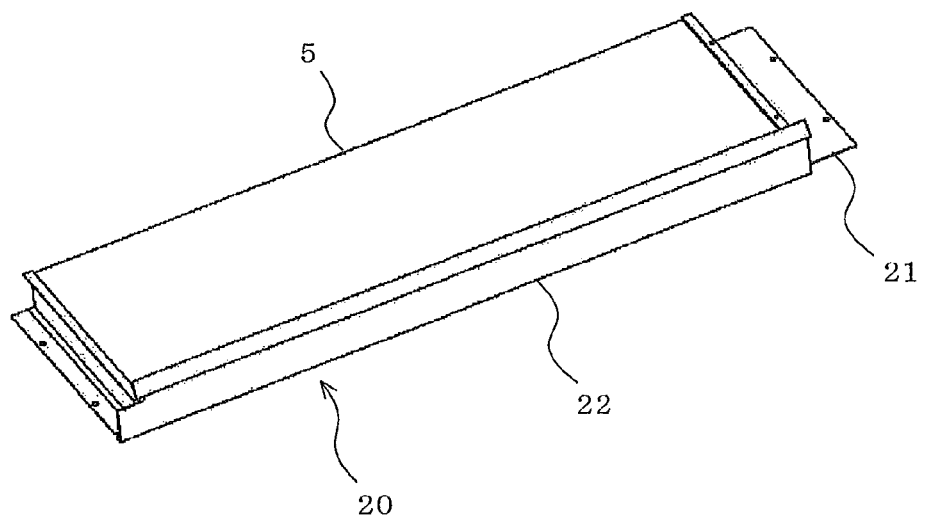
FIG. 8 is a perspective view illustrating an outdoor heat exchanger module of the vehicular air-conditioning apparatus according to the exemplary embodiment.

FIG. 7 is a perspective view illustrating the indoor heat exchanger module of the vehicular air-conditioning apparatus according to the exemplary embodiment, and FIG. 8 is a perspective view illustrating the outdoor heat exchanger module of the vehicular air-conditioning apparatus according to the exemplary embodiment.

As shown in FIG. 7, an indoor heat exchanger module 19 includes the indoor heat exchanger 4, the solenoid valve 16 for controlling the capacity of the refrigerant, a distributor 23 for distributing the refrigerant, a capillary tube (not shown) for expanding the refrigerant, sheet metal members 21 provided on both ends of the indoor heat exchanger 4 in the longitudinal direction, and an air flow partition plate 22 provided on one lateral side of the indoor heat exchanger 4 in the width direction.

As shown in FIG. 8, an outdoor heat exchanger module 20 includes the outdoor heat exchanger 5, the sheet metal members 21 provided on both ends of the outdoor heat exchanger 5 in the longitudinal direction, and the air flow partition plate 22 provided on one lateral side of the outdoor heat exchanger 5 in the width direction. The above-mentioned sheet metal members 21 are parts for mounting the indoor heat exchanger 4 and outdoor heat exchanger 5 on the frame 1. Work on the production line can be reduced and productivity can be improved by attaching the sheet metal members 21 to the indoor heat exchanger 4 and outdoor heat exchanger 5 in advance. The air flow partition plate 22 is a member for preventing the air flow that has passed through the respective one of the heat exchangers 4 and 5 from passing through the heat exchanger again.

Next, a detailed description will be given of the assembling of the refrigeration cycle module and the mounting of the refrigeration cycle module.

Figure 9:
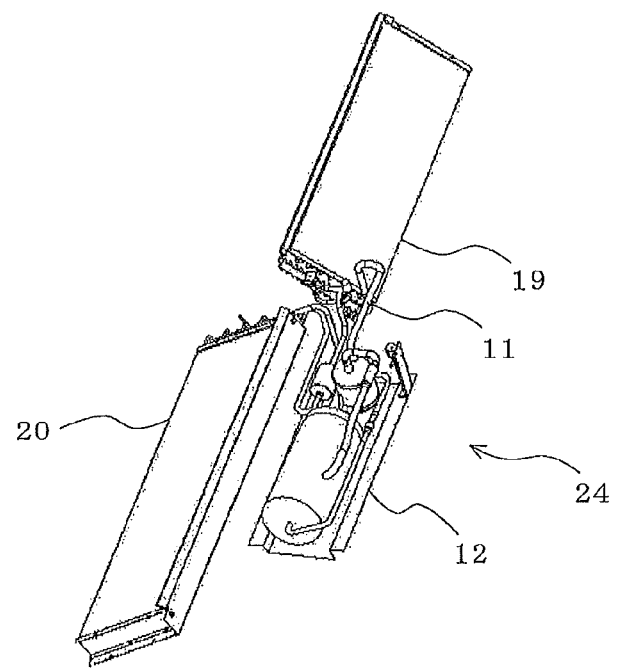
FIG. 9 is a perspective view illustrating a refrigeration cycle module of the vehicular air-conditioning apparatus according to the exemplary embodiment.
Figure 10:
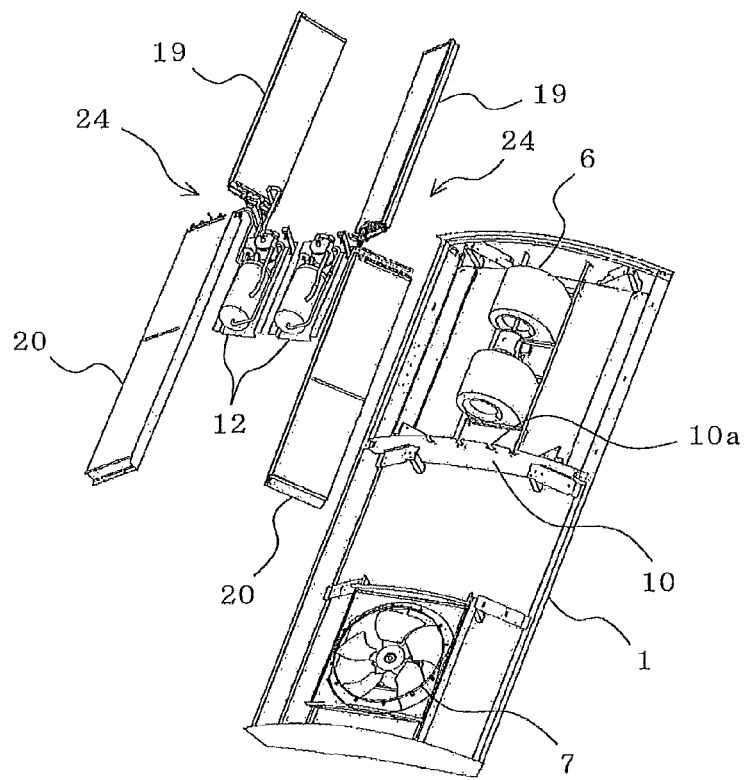
FIG. 10 is a perspective view illustrating a state of the refrigeration cycle module of FIG. 9 before being mounted into a vehicular-air-conditioner frame.
Figure 11:
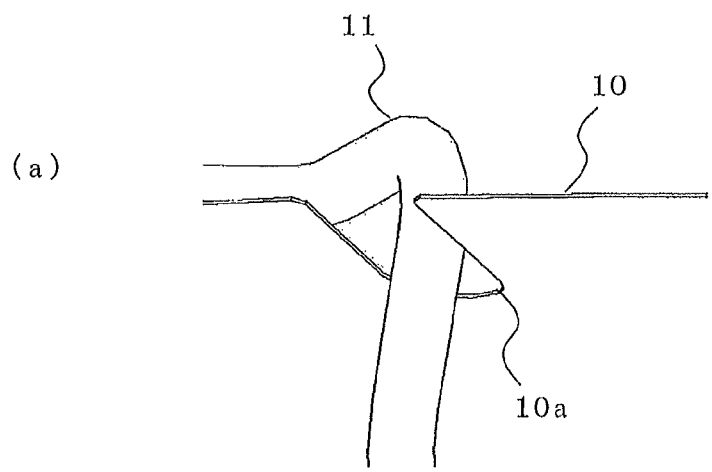
FIG. 11 is a perspective view illustrating an explanatory configuration of a partition plate with respect to a refrigerant pipe when the refrigeration cycle module of FIG. 9 is mounted into the vehicular-air-conditioner frame.
Figure 11:
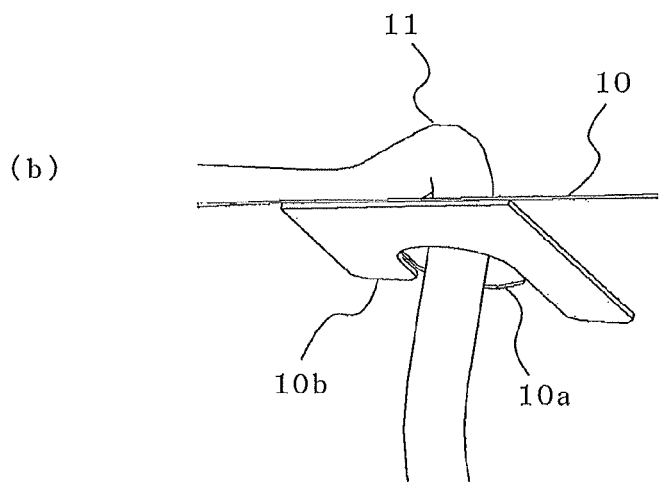

FIG. 9 is a perspective view illustrating a refrigeration cycle module of the vehicular air-conditioning apparatus according to the exemplary embodiment, FIG. 10 is a perspective view illustrating a state of the refrigeration cycle module of FIG. 9 before being mounted into a vehicular-air-conditioner frame, and FIG. 11 is a perspective view illustrating an explanatory configuration of a partition plate with respect to a refrigerant pipe when the refrigeration cycle module of FIG. 9 is mounted into the vehicular-air-conditioner frame.

A refrigeration cycle module 24 is configured by connecting the compressor module 12, the indoor heat exchanger module 19, and the outdoor heat exchanger module 20 illustrated in FIGS. 4, 7, and 8 with the refrigerant pipes 11. The compressor module 12, the indoor heat exchanger module 19, the outdoor heat exchanger module 20, and the refrigeration cycle module 24, which is configured by combining these modules 12, 19, and 20, are assembled off the production line as described above.

As shown in FIG. 10, the refrigeration cycle modules 24 are mounted into the vehicular-air-conditioner frame 1 on the production line after the indoor fan 6, the outdoor fan 7, and other components are mounted thereto. It will be possible to simultaneously carry out assembling on the production line and assembling of the refrigeration cycle module 24 and, thus, to improve productivity.

When each refrigeration cycle module 24 is mounted into the vehicular-air-conditioner frame 1, although the refrigerant pipe 11 extends over the partition plate 10 of the vehicular-air-conditioner frame 1, since a U-shaped notch 10a is provided in the upper portion of the partition plate 10 as shown in FIG. 11, it will be possible to mount the refrigeration cycle module 24 into the vehicular-air-conditioner frame 1 by receiving the refrigerant pipe 11 into the notch 10a from above the notch. Thereafter, the notch 10a is closed with a closing plate 10b and the gap of the notch 10a is further filled with putty such that air-tightness between the indoor compartment 8 and the outdoor compartment is maintained.

As described above, in the exemplary embodiment, the compressor module 12, the indoor heat exchanger module 19, and the outdoor heat exchanger module 20 are assembled off the production line, as well as the refrigeration cycle module 24 by connecting these modules 12, 19, and 20 by refrigerant pipes 11. Accordingly, scarcely any brazing work of the refrigerant pipes 11 is required on the production line; hence, work is facilitated, quality improvement is enabled, and productivity can be substantially improved.

Further, by carrying out assembling of each of the modules 12, 19, and 20 and the refrigeration cycle module 24 off the production line, it will be possible to carry out vacuum drawing of and charging of the refrigerant to the refrigeration cycle and to carry out refrigerant leakage check and the like off the production line. Accordingly, it will be possible to substantially reduce work time on the production line.

Note that although in the exemplary embodiment, the refrigeration cycle module 24 is assembled with each of the modules 12, 19, and 20, the refrigeration cycle module 24 may not be assembled. That is, workability, quality, and productivity can be improved by assembling only the compressor module 12, the indoor heat exchanger module 19, and the outdoor-heat exchanger 20 off the production line. In this case, each of the modules 12, 19, and 20 is mounted on the vehicular-air-conditioner frame 1 with the completion of the arrangement and brazing of the components of each module. Here, other than being able to dispense with the notch 10a of the partition plate 10, brazing on the production line can be reduced to three points at the fewest.

Further, the same advantageous effects can be obtained by assembling only one of the compressor module 12, indoor heat exchanger module 19, and the outdoor heat exchanger module 20, or two of the modules.

Figure 12:
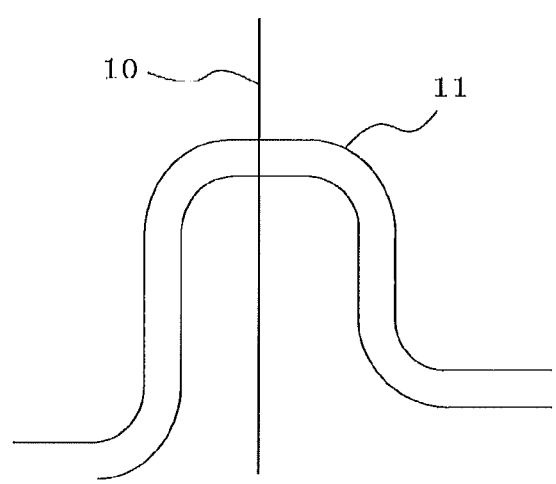
FIG. 12 is a perspective view illustrating a modification of FIG. 9.

Furthermore, in the exemplary embodiment, the refrigerant pipe 11 is received into the U-shaped notch 10a provided in the upper portion of the partition plate 10 of the vehicular-air-conditioner frame 1 from above the notch 10a when the refrigeration cycle module 24 is mounted into the vehicular-air-conditioner frame 1; however, the invention is not limited to this. For example, as shown in FIG. 12, by bending the refrigerant pipe 11 into an inverted U-shape in advance, the depth of the cutaway of the U-shaped notch 10a provided in the upper portion of the partition plate 10 can be made shallow. Moreover, stress exerted on the refrigerant pipe 11, which is disposed between the compressor module 12 being a vibration portion and the indoor and outdoor heat exchanger modules 19 and 20 being fixing portions, can be alleviated. Note that in the above case as well, the notch 10a is closed with a closing plate 10b and the gap of the notch 10a is further filled with putty such that air-tightness between the indoor compartment 8 and the outdoor compartment 9 is maintained.

Additionally, although the description is given above of an assembling method of a vehicular air-conditioning apparatus that is mounted on a roof of a vehicle, the invention is not limited to this, and, for example, the method may be applied to a vehicular air-conditioning apparatus disposed on a floor, inside a floor, or under a floor of a vehicle.

REFERENCE SIGNS LIST 1 vehicular-air-conditioner frame; 2 compressor; 3 refrigerant gas-liquid separator; 4 indoor heat exchanger; 5 outdoor heat exchanger; 6 indoor fan; 7 outdoor fan; 8 indoor compartment; 9 outdoor compartment; 10 partition plate; 10a notch; 10b closing plate; 11 refrigerant pipe; 12 compressor module; 13 support; 14 check valve; 15 drying device; 16 solenoid valve; 17 filter; 18 mounting member; 19 indoor heat exchanger module; 20 outdoor heat exchanger module; 21 sheet metal member; 22 air flow partition plate; 23 distributor; 24 refrigeration cycle module; 25 rubber vibration insulator; 26 base plate.

The invention claimed is:

1. An assembling method of a vehicular air-conditioning apparatus including various equipment, which is required for air-conditioning a vehicle, mounted in a vehicular-air-conditioner frame on a production line, the frame comprising an indoor compartment and an outdoor compartment, the assembling method of the vehicular air-conditioning apparatus comprising the steps of:
   modularizing a refrigerant cycle including at least a compressor, an indoor heat exchanger, and an outdoor heat exchanger, among the various equipment, that are connected with refrigerant pipes by assembling the refrigerant cycle out of the frame to form a refrigerant cycle module that is assembled off the production line; and
   incorporating the refrigerant cycle module onto the frame on the production line so that the refrigerant cycle module is located in both the indoor compartment and the outdoor compartment of the frame;
   wherein the indoor heat exchanger is located in the indoor compartment and the outdoor heat exchanger is located in the outdoor compartment when the refrigerant cycle module is incorporated onto the frame on the production line.

2. The assembling method of the vehicular air-conditioning apparatus of claim 1, further comprising the steps of:
   providing a U-shaped notch in an upper portion of a partition plate provided in a substantially middle portion of the frame; and
   receiving a refrigerant pipe of the refrigeration refrigerant cycle module into the notch from above the notch when mounting the refrigerant cycle module into the frame.

3. The assembling method of the vehicular air-conditioning apparatus of claim 2, further comprising the step of bending a portion of the refrigerant pipe that extends over the notch into an inverted U-shape.

4. The assembling method of the vehicular air-conditioning apparatus of claim 1, further comprising the step of modularizing the compressor and auxiliary equipment of the compressor as a single component of the refrigerant cycle module by combining the compressor and the auxiliary equipment off the production line.

5. The assembling method of the vehicular air-conditioning apparatus of claim 1, further comprising the step of modularizing the indoor heat exchanger and parts required in the indoor heat exchanger as a single component of the refrigerant cycle module by combining the indoor heat exchanger and the parts off the production line.

6. The assembling method of the vehicular air-conditioning apparatus of claim 1, further comprising the step of modularizing the outdoor heat exchanger and parts required in the outdoor heat exchanger as a single component of the refrigerant cycle module by combining the outdoor heat exchanger and the parts off the production line.

7. The assembling method of the vehicular air-conditioning apparatus of claim 1, wherein an indoor fan is included in the indoor compartment and an outdoor fan is included in the outdoor compartment.

* * * * *